(12) United States Patent
Pidduck et al.

(10) Patent No.: US 10,810,264 B2
(45) Date of Patent: Oct. 20, 2020

(54) SYSTEM AND METHOD FOR A NETWORKED DOCUMENT MANAGEMENT SYSTEM WITH REDUCED STORAGE AND PROCESSING REQUIREMENTS AND IMPROVED DOCUMENT RECOVERY

(71) Applicant: Open Text SA ULC, Halifax (CA)

(72) Inventors: Patrick Thomas Sidney Pidduck, Waterloo (CA); Kyle Nathan Swidrovich, Waterloo (CA)

(73) Assignee: OPEN TEXT SA ULC, Halifax (CA)

( * ) Notice: Subject to any disclaimer, the term of this patent is extended or adjusted under 35 U.S.C. 154(b) by 309 days.

(21) Appl. No.: 15/601,730

(22) Filed: May 22, 2017

(65) Prior Publication Data

US 2017/0344540 A1 Nov. 30, 2017

Related U.S. Application Data

(60) Provisional application No. 62/340,620, filed on May 24, 2016.

(51) Int. Cl.
*G06F 16/93* (2019.01)
*G06F 16/27* (2019.01)
(Continued)

(52) U.S. Cl.
CPC ............ *G06F 16/93* (2019.01); *G06F 16/219* (2019.01); *G06F 16/27* (2019.01); *G06Q 10/10* (2013.01); *G06Q 10/101* (2013.01)

(58) Field of Classification Search
CPC ...... G06F 16/21; G06F 16/93; G06F 21/6218; G06F 16/22; G06F 16/23; G06F 16/2455; G06F 16/2465; G06F 16/26; G06F 16/282; G06F 16/289; G06F 21/629; G06F 16/219; G06F 16/27; G06F 11/2094; G06F 16/2228; G06F 16/2282; G06F 16/2365; G06F 16/2379; G06F 16/3338; G06F 16/9535; G06F 17/241; G06F 21/6245; G06F 21/6272; G06F 21/78; G06F 2201/805; G06F 2201/81; G06F 2201/82;
(Continued)

(56) References Cited

U.S. PATENT DOCUMENTS

2009/0254529 A1* 10/2009 Goldentouch ...... G06F 16/9535
2009/0254572 A1* 10/2009 Redlich ................ G06Q 10/107
(Continued)

FOREIGN PATENT DOCUMENTS

WO WO 2015070174 5/2015

OTHER PUBLICATIONS

European Search Report for Application No. 17172705.0, dated Nov. 7, 2017, 9 pgs.

*Primary Examiner* — Shyue Jiunn Hwa
(74) *Attorney, Agent, or Firm* — Sprinkle IP Law Group

(57) ABSTRACT

Embodiments of document management systems that utilize replicas are disclosed. A core document management module of a document management system is configured to return a replica (if one exists) in response to a request for either a version of a document or a replica of the document. Thus, modifications that are done by a user or an automated add-in module may be performed on the replica. When a process stores the modified document it may store it as a replica. This modified replica will replace the existing replica of the version.

15 Claims, 5 Drawing Sheets

(51) Int. Cl.
*G06Q 10/10* (2012.01)
*G06F 16/21* (2019.01)

(58) Field of Classification Search
CPC .......... G06F 2221/033; G06F 2221/07; G06F 2221/2111; G06F 2221/2137; G06F 2221/2141; G06F 30/00; G06F 3/0482; G06F 3/0611; G06F 3/0643; G06F 3/0644; G06F 3/0653; G06F 3/0659; G06F 3/0685; G06F 40/103; G06F 40/197; G06F 8/60; G06F 8/61; G06F 8/63; G06F 8/71; G06F 9/445; G06F 9/44505; G06F 9/455; G06F 9/45529; G06F 9/45558; G06F 9/485; G06F 9/4887; G06F 9/50; G06F 9/5061; G06F 9/522

See application file for complete search history.

(56) References Cited

U.S. PATENT DOCUMENTS

2010/0250497 A1* 9/2010 Redlich .............. F41H 13/0093
707/661
2013/0262420 A1 10/2013 Edelstein et al.

* cited by examiner

SYSTEM AND METHOD FOR A NETWORKED DOCUMENT MANAGEMENT SYSTEM WITH REDUCED STORAGE AND PROCESSING REQUIREMENTS AND IMPROVED DOCUMENT RECOVERY

RELATED APPLICATIONS

This application claims a benefit of priority under 35 U.S.C. 119 to U.S. Provisional Patent Application Ser. No. 62/340,620, filed May 24, 2016, entitled "SYSTEM AND METHOD FOR A NETWORKED DOCUMENT MANAGEMENT SYSTEM WITH REDUCED STORAGE REQUIREMENTS," by Pidduck et al., which is incorporated herein in its entirety by reference.

TECHNICAL FIELD

This disclosure relates generally to the managing of electronic documents utilizing a document management system. Even more specifically, this disclosure relates to document management systems which reduce storage and processing requirements and improve document recovery by utilizing replicas of stored electronic documents to manage the electronic documents.

BACKGROUND

A document management system is a system used to track, manage, and store electronic documents. Most document management systems are capable of keeping a record of the various versions created and modified by different users (e.g., history tracking) and may provide various other capabilities such as security, searching, workflow, or collaboration. Document management systems have a large overlap with the concepts of content management systems, and for purposes of this disclosure the two types of systems may be thought of interchangeably.

In a document management system that manages electronic documents, there is thus often a need to retain old versions of documents. There are many possible reasons why versions are separately stored including: many document management systems need to be able to restore an earlier version of a document; providing a history of changes to a document; adhering to policy rules or legal requirements for retaining documents; or a number of other reasons. Of special interest are versions that have been created by automated processes, which can occur without explicit user interaction.

Many document management systems may employ a number of such automated processes to automatically perform system related tasks during the lifecycle of a managed document. Additionally, users of document management systems may employ such automated process to perform desired tasks on a managed document. In either case, such an automated process may access and alter a document without explicit user interaction or involvement, and possibly asynchronously to user interactions with the managed documents or the document management system. For example, an automated process may create a new version of a document to add a watermark, or update numbering or other metadata fields within the document.

In most cases, when an automated process accesses and alters a managed document, a new version of the managed document is created. Retaining older versions of documents increases the cost of managing a document because each version requires additional storage space, and may also require additional associated metadata in a database (for the new version). Moreover, the use of such automated processes may complicate the recovery of such managed documents, as these automated processes may (e.g., because of bugs, poor design, unexpected system failure, hardware failure, etc.) corrupt a document. As the corrupting process is automated (and the document may subsequently be accessed by other automated processes), the corruption of the document may not be discovered until a later point in time (e.g., when a user attempts to open the document in an associated application). These problems are thus exacerbated as the number of automated processed employed in the document management system grows, as the proliferation of these automated processes result in a commensurate proliferation of older versions of managed documents and an increased possibility of corruption.

These problems also result in an unfortunate feedback loop. As the proliferation of the number of documents and associated versions increases, many users of content management systems have employed storage control methods whereby older versions of documents are automatically expunged from their document management system. These processes may, however, be unaware of when these documents have become corrupted. Accordingly, in certain instances even when it is discovered that a version of a document is corrupt, the document cannot be adequately recovered by the document management system as the last uncorrupted version of the document has been purged from storage.

What is needed therefore are document management systems that allow processes or users to act asynchronously (or synchronously) on documents while simultaneously reducing the proliferation of versions of documents (and corresponding storage requirements) and preserving the easy and straightforward recovery of a document (e.g., a canonical version of the document).

SUMMARY

To those ends, among others, embodiments of document management systems that utilize replicas are disclosed. Specifically, a replica may be an altered (e.g., modified or supplemented) copy of an original version of a document that retains the format of the version on which it is based. Often times a replica may be created by an automated process or a triggering event. A core document management module of the document management system is configured to return a replica (if one exists) in response to a request for either a version of a document or a replica of the document.

Accordingly, modifications that are done by a user or an automated add-in module (process) may be performed on the replica. When an automated process stores the modified document it may store it as a replica. This modified replica will replace the existing replica of the version. In this manner, modifications may be made to the replica, all such modifications may be cumulative, and an accessing user or process may have access to the replica of the document containing all the cumulative modifications. As a result a single version of the document may be maintained in its original form (e.g., unmodified from when it was originally created) and may be utilized in cases where the replica is corrupted or otherwise inaccessible. Moreover, when a new version of a document is eventually created (e.g., when a human user modifies the document and saves a new version) it may contain all the modifications of the replica on which it was based.

In one embodiment, a document management system may include a processor, a data store, and a non-transitory computer readable medium, comprising instructions for an interface and a core document management module. The core document management module may store a version of a first document in the data store and store a replica of the version of the first document in the data store. A first request for the version of the first document can be received through the interface and the replica provided from the data store in response to the first request. A second request to store a second document as the replica of the version of the first document can be received through the interface and the received second document stored as the replica by replacing the replica in the data store with the received document.

In a particular embodiment the first and second request are received from a user computer over a network, or from an add-in module. An add-in module may be operable for requesting the version of the first document through the interface, receiving the replica, modifying the replica to create a second document and requesting the second document be stored as the replica through the interface.

Additionally, in still another embodiment, a rendition of the replica may be created in the data store, where the rendition is in a different format than the replica. A third request for the version of the first document may be received through the interface. It can be determined whether a user associated with the third request is a privileged or a non-privileged user. The replica may be provided from the data store in response to the third request if the user is a privileged user. Otherwise, the rendition may be provided from the data store in response to the third request if the user is a non-privileged user.

In yet another embodiment, it can be determined that the replica is corrupted and the version of the first document restored. This restoration may be accomplished by, for example, deleting the replica of the document.

Accordingly, embodiments as disclosed herein may provide a number of advantages, including reduced storage requirements and the ability to provide current documents to users while also accommodating asynchronous updates to the documents, including asynchronous modification made by automated processes or the like. Moreover, the document recovery of document management systems using such replicas may be improved, as the most recent version of the document may remain unmodified, allowing it to be utilized for document recovery in cases where a replica is discovered to be corrupt.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
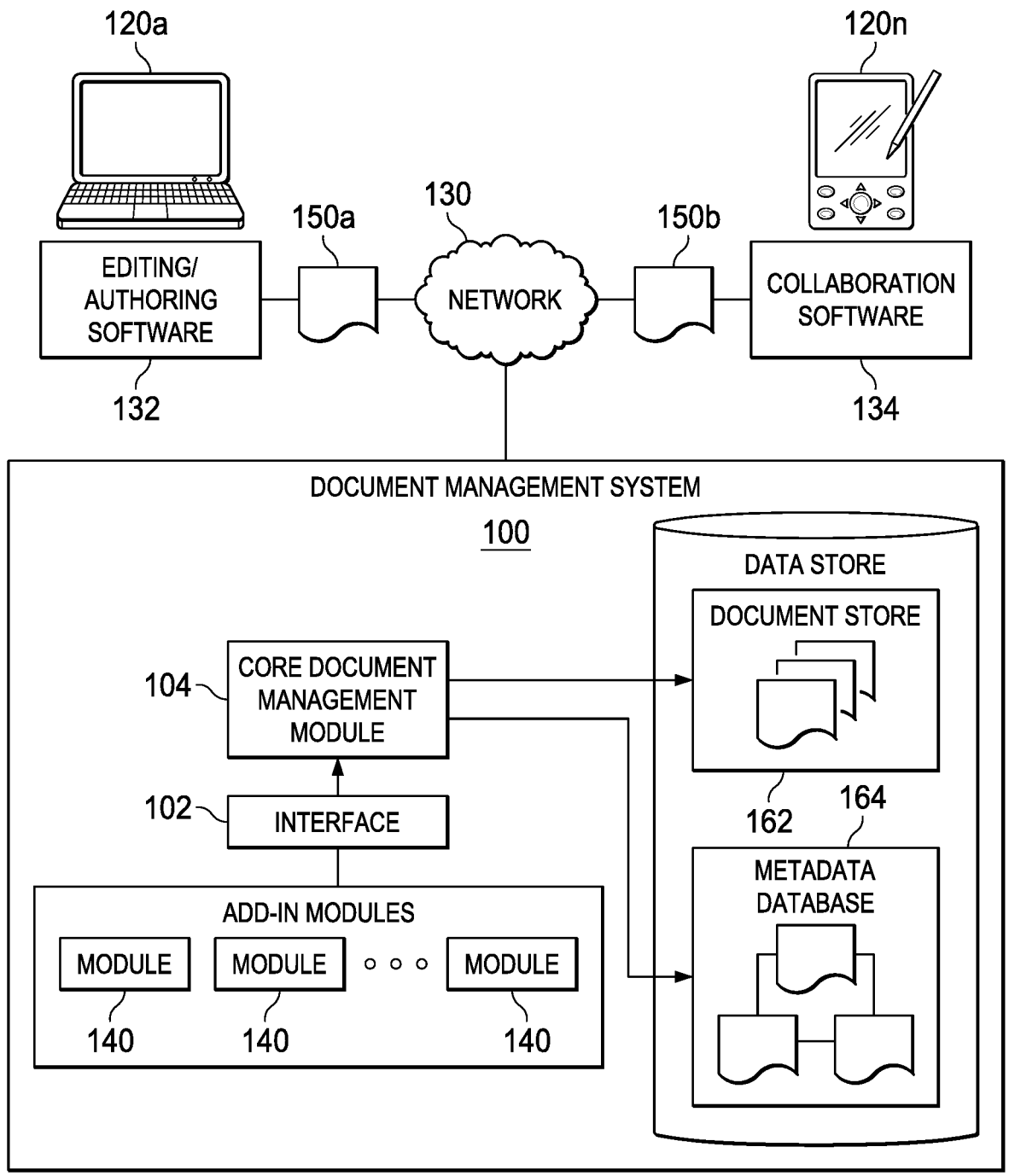
FIG. 1 depicts a diagrammatic representation of a document management system.

The disclosure and various features and advantageous details thereof are explained more fully with reference to the exemplary, and therefore non-limiting, embodiments illustrated in the accompanying drawings and detailed in the following description. It should be understood, however, that the detailed description and the specific examples, while indicating the preferred embodiments, are given by way of illustration only and not by way of limitation. Descriptions of known programming techniques, computer software, hardware, operating platforms and protocols may be omitted so as not to unnecessarily obscure the disclosure in detail. Various substitutions, modifications, additions and/or rearrangements within the spirit and/or scope of the underlying inventive concept will become apparent to those skilled in the art from this disclosure.

Before delving into embodiments in more detail, some brief context may be useful. In a document management system that manages electronic documents there is often a need to retain old versions of documents. Examples of such document management systems include OpenText Corporation's document management products, OpenText Corporation's' Content Suite Platform (including Content Server), OpenText Corporation's Tempo Box, OpenText Corporation's Enterprise Connect, OpenText Corporation's eDOCS, or the like. It should be understood that while the description herein regularly refers to documents and document versions, replicas, renditions, etc., in practice, embodiments apply to any type of digital information that may be stored, and the term "document" is used as a convenience. Where "documents" are referenced, it should be understood that any type of stored and managed information may be processed by the embodiments as disclosed, including but not limited to: office productivity software such as text editors, spreadsheets and slide presentations; publishing formats such as Adobe PDF; computer aided design and drafting files; scanned images; photographs; digital audio information; digital video information; computer output report, log files or print files; web pages; computer software source code; or other data that may be stored on digital media.

With that in mind, consider the case where a document is kept within a document management system, but needs to be modified. The document may be obtained from the document management system, updated, then stored back into the document management system. This new version of the document is now another item to be managed by the document management system. In other words, a version of a document is a more recent file that is associated with the original. Every time a procedure takes place that updates the document, a new version may be created. The creation and use of versions of documents is well understood in the context of document management systems.

There are many possible reasons why a new version may be separately stored, instead of replacing the previous version. These may include, among other reasons: realizing that an error was made and restoring to an earlier version; providing a history of changes that allows the process of creating the document to be reviewed; adhering to policy rules or legal requirements for retaining documents; or a number of other reasons.

Retaining older versions of documents increases the cost of managing a document at least because each version requires additional storage space, and often requires additional representations of metadata in an associated database. As the number of documents created in most settings is widely proliferating, the number of versions of documents that may be created is similarly increasing. This situation, in turn, is increasing the computing requirements and costs of operating a document management system.

There are several reasons for the increase in the rate of document version creation. For example, many enterprises strongly integrate their document authoring and editing software and the document management system. This encourages even "work in progress" documents to be centrally stored in a document management system.

Additionally, new collaboration software is becoming popular. With many people capable of editing the same document in a short period of time, the possible number of versions of a document that are created can increase dramatically.

Both of these scenarios illustrate a common pattern in the lifecycle of a document—rapid changes by users and many versions occurring in relatively short periods, usually near the start of a document's life.

Additionally, however, documents managed by the document management system may be modified unbeknownst to a user or without direct user intervention or awareness. In many cases, a document management system may include a number of automated processes that execute in the background (or as batch processes that execute at some interval) that may access and modify documents. For example, an automated process may update documents to include a version number assigned by the document management system within the document properties.

As another example, a security application may require the "security clearance" of a document to be included as a watermark in the document. The security clearance may be changed within the document management system, and when this occurs, the document must be updated to reflect the new security clearance.

Another type of automated process may analyze documents in the document management system to determine a records management classification. The determined classification may be added to the document, where it may be reflected in a field within the title page or document header.

As still another example, a document within the document management system may be reviewed in an approval process. Once approval occurs, the document may be assigned an "official" status, or be promoted from a minor version number to a major version number. This new version number or the "official" designation triggers an update to the document.

There are many other possible reasons why a document that is managed within a document management system may need to be modified. These changes can occur for the first version of a document, or occur on previously modified versions of a document. It is also possible that many automated changes to a document may be necessary over the life of a document.

When a user submits a document to a document management system, however, they have a high expectation that the document can be retrieved intact. A key challenge with automated updates to the document as discussed is the risk that the processes that update the documents are not always perfect. If a problem occurs which corrupts the original document or otherwise renders it unusable, this situation can go undetected (as the processes may not involve the user). Examples would be automated software processes that fail to read or write the document format in its entirety, software bugs, unexpected hardware failures, or even transient errors in communication. The result of such errors may be a loss of information, which violates one of the primary objectives of the use of a document management system in the first place.

Again, as discussed above, one way to combat the possibility of data loss, is through the use of versions. Every time a procedure takes place that modifies the document, a new version is created. In the event that a data corruption takes place, only the new version is corrupted. A user that tries to retrieve the document would typically be given the most current version. If this version is corrupted, the user has the option of retrieving older versions, eventually locating one that is intact.

Another way of dealing with the possibility of data loss when managed documents are automatically (or otherwise) modified is through the use of renditions. A rendition is a transformation of the document (usually to another file format), associated with a version of the document. The most common use of renditions is to transform a document into a format that meets business needs such as portability or security. A version of a document may have a single rendition having generally the same content as the version, while in some cases multiple renditions of the same version of the document may be created, each rendition having generally the same content as other renditions of the same version.

For example, a user may add an AutoCAD drawing as a version of a document to the document management system. The document management system may then automatically transform the original AutoCAD document (the original version of the document) to a PDF document. The PDF document is a rendition of the original AutoCAD document and may be associated with the same version of the document. An average user attempting to retrieve the drawing may be presented with the PDF document when accessing the document. Only users with special privileges (e.g., a privileged user), such as permission to edit, would have access to the original AutoCAD version of the document.

It is possible to configure a document management system to maintain only one rendition per document, or per version of a document. Such a configuration greatly reduces the problem of storage costs increasing since the number of renditions (for a version of the document) is bounded.

Renditions, however, are not an ideal solution for the data corruption problem that may occur with automated updates to managed documents. This is because renditions usually change the format of a document. This situation makes the propagation of changes between a rendition of the document and an original version of the document difficult. For example, a privileged user retrieving an original Word format of document (e.g., instead of a PDF rendition) will not see any updates such as security clearances, classifications or version numbers that have been inserted into the associated PDF rendition. Conversely, a (non-privileged) user retrieving the PDF rendition of a document may only have limited ability to edit the document.

Moreover, if using renditions, the document management system will also have a difficult time ensuring that all automated updates to a version of the document are always applied. Since such rendition markings may not be reflected in a subsequent version of the document, a sequence of updates will need special handling to be able to store all the automated updates that should be applied (e.g., to replay all the rendition actions that were applied to the original version of the document). This tracking can be extremely difficult if the updates are done by different types of tasks. For example, the automated process that inserts version information into a document may be completely different from the automated process that can add watermarks to a document.

The use of renditions and versions may be better explained with reference to FIGS. 1-3 which depicts a document management system and various scenarios for using such a document management system. In the example shown in FIG. 1, document management system 100 is a computer system, including a processor and a non-transitory computer readable medium, coupled to a network 130 such as the Internet, an internet, an intranet, a Local Area Network (LAN), a Wide Area Network (WAN), a wireless network, a wired network or some other type of computer network or combination of computer networks.

Document management system 100 includes an interface 102 accessible directly over network 130 by an application executing on a user's computer device 120 (e.g., 120a, 120n) or from one or more add-in modules 140. Such an interface 102 may include an Application Programming Interface (API) or web service interface (e.g., a REpresentational State Transfer (REST) interface, a Simple Object Access Protocol (SOAP) interface, etc.). This interface 102 may include interfaces that may be integrated with or accessed by an application at the user device 102, an interface 102 that may be presented and accessed directly by the user at user device 120 (e.g., through interfaces presented in a browser executing on user device 120), or an interface that may be accessed by an add-in module 140 of the document management system 100.

Using the interface 102 then, a document may be added to the document management system 100 or a document managed by the document management system 100 may be accessed. For example, an author may create an original version 150a of a document using editing/authoring software 132 running on user device 120a and a collaborator may modify the original version of the document using collaboration software 134 running on user device 120n, resulting in version 150b of the document being communicated to information management system 100 over network 130 through interface 102 and stored in document store 162.

More specifically, core document management module 104 may manage documents stored in document storage 162 using metadata for managing the documents stored in metadata database 164. Thus, the content of the document (e.g., the bits that make up the document itself) are stored in document store 162 while the metadata for managing the documents stored in document store 160 is stored in the metadata database 164. Additionally, corresponding metadata for the document is created in the metadata database 164 for each version or rendition of a document. For example, there may be an object or entry in a table, etc. (collectively entry) in metadata database 164 for the document object, an entry in metadata database 164 for each version or rendition of the document as stored in document store 162 or other entries in metadata database 164 that allow the management of the document. The entries in the metadata database 164 include information to associate the different versions and renditions with one another and to locate the content of the versions or renditions in the document store 162.

Thus, continuing with the above example, when the version 150a of the document is added to, or otherwise ingested by the document management system 100, the content of the document is stored as the first version 150a of the document in the document store 162. An entry for the document object and the first version 150a of the document is created in metadata database 164. Subsequently, when the first version 150a of the document is modified by the user and the modified version 150b of the document is communicated to document management system 100, the content of the modified document is stored as the second version 150b of the document in the document store 162. An entry for the second version 150b of the document is created in metadata database 164 and associated with the entry for the document object and the first version 150a of the document. Thus, it can be determined from metadata database 164 if a version of a document exists, what the most current version of a document is, what the format of the versions are, where the content of the versions are located in data store 162, or other data about the versions.

Similarly, if a rendition of a document is created, the content of the rendition may be stored in the document store 162 while an entry for the rendition of a version of the document is created in the metadata database 164 and associated with the entry for the document object and an entry for the version of the document corresponding to the rendition. In this manner, it can be determined from metadata database 164 if a rendition for a version of a document exists, what the format of the rendition is, where the content of the rendition is located in data store 162, or other data about the rendition.

Document management system 100 may also have a set of add-in modules 140. These modules 140 may be independently developed and added to the document management system 100. In particular, each of the modules 140 may operate substantially asynchronously to perform certain functionality specific to that module 140. Moreover, these modules 140 may operate autonomously or automatically when certain events occur (e.g., without involvement of a user). For example, a module 140 may be a document properties synchronization (DPS) module intended to add metadata to a version of a document when a new version of a document is added or created. Another module 140 may be a watermarking module that can include certain data (e.g., a security clearance level for a document) in a watermark for the document. Still another module 140 may be a classification module that may analyze a document to determine a records management classification for the document without user involvement. The module 140 may add the classification to the version of the document where it may be reflected in a field within the document such as the title page or document header. As will be noted, these types of add-in modules are provided by way of example, many other types of such add-in modules are possible and contemplated herein. As can be seen, there are many reasons why a document within the document management system 100 may be modified.

In many cases, the architecture of the document management system 100 is extensible to allow independently developed add-in modules 140 to be added to the document management system 100 (e.g., by an entity deploying, developing, providing or creating the document management system 100). Specifically, when an add-in module 140 is integrated into the document management system 100 it may be allowed access as a privileged user of the document management system and register for events with an interface 102 or the core document management module 104. These events may include, for example, the creation of a new version of a document (e.g., in document store 162) or the creation of a rendition of a document (e.g., in document store 162).

When an event occurs, a callback or other notification may be sent from the core document management module 104 to each module 140 that registered for that event. The module(s) 140 can then perform actions based on the event. In particular, in many cases, a module 140 may obtain a current version of the document (e.g., using an interface 102 such as an application programming interface (API) or REpresentational State Transfer (REST) interface allowing the module 140 to obtain the current version of the document), perform one or more actions on the document that may modify the document, and store the modified document as a new version of the document (e.g., using an interface 102 such as an API or REST interface allowing the module 140 to store a new version of the document).

As may be realized from a review of the above description, the architecture and operation of the document management system 100 may result in the undesirable proliferation of versions of documents. First, user interaction with a document through an application 132, 134 on their devices 120 may result in the creation of new version of a document. Moreover, the operation of the add-in modules 140 may also result in new versions of documents being created. In particular, as there may be many add-in modules 140 operating (and operating asynchronously) within a document management system 100, each time an add-in module 140 modifies a document a new version of a document may be created. Moreover, recovery of these documents may be difficult, if a version of the document is corrupted by an add-in module 140, each subsequent access by an add-in modules 140 may further modify the corrupted version, making the determination of an the last uncorrupted version of any document exceedingly difficult.

Figure 2:
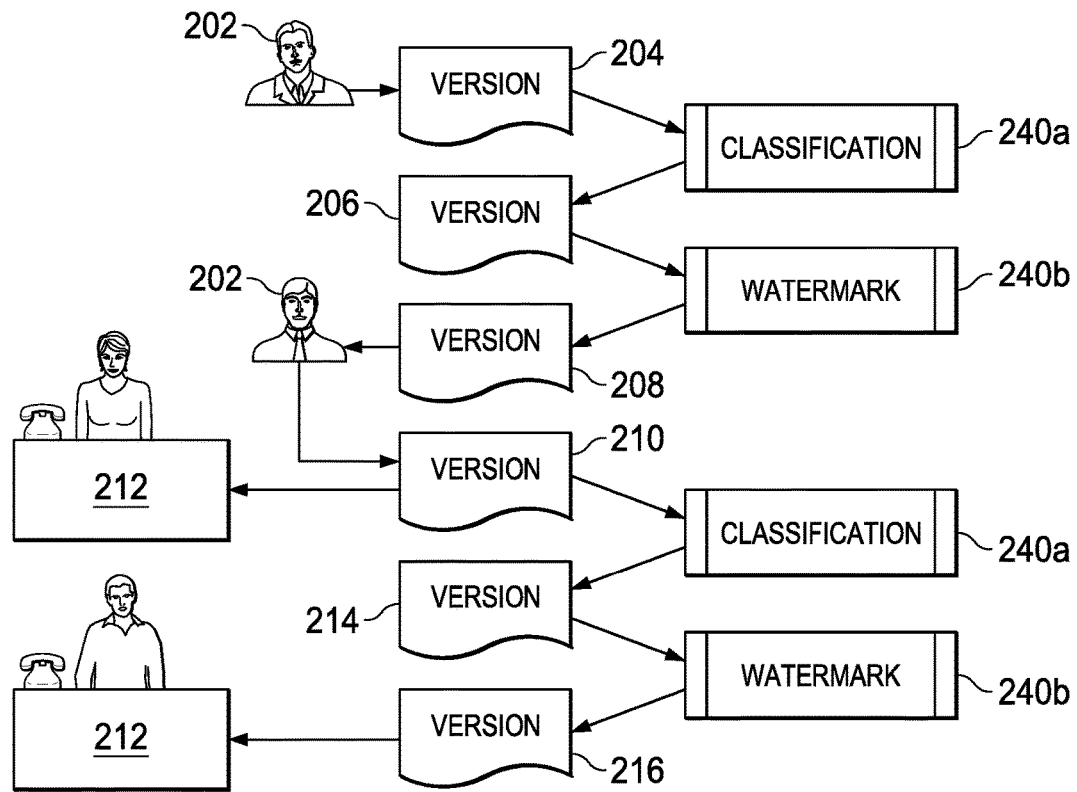
FIG. 2 depicts a diagrammatic representation of an example scenario using a document management system with versions.
Figure 3:
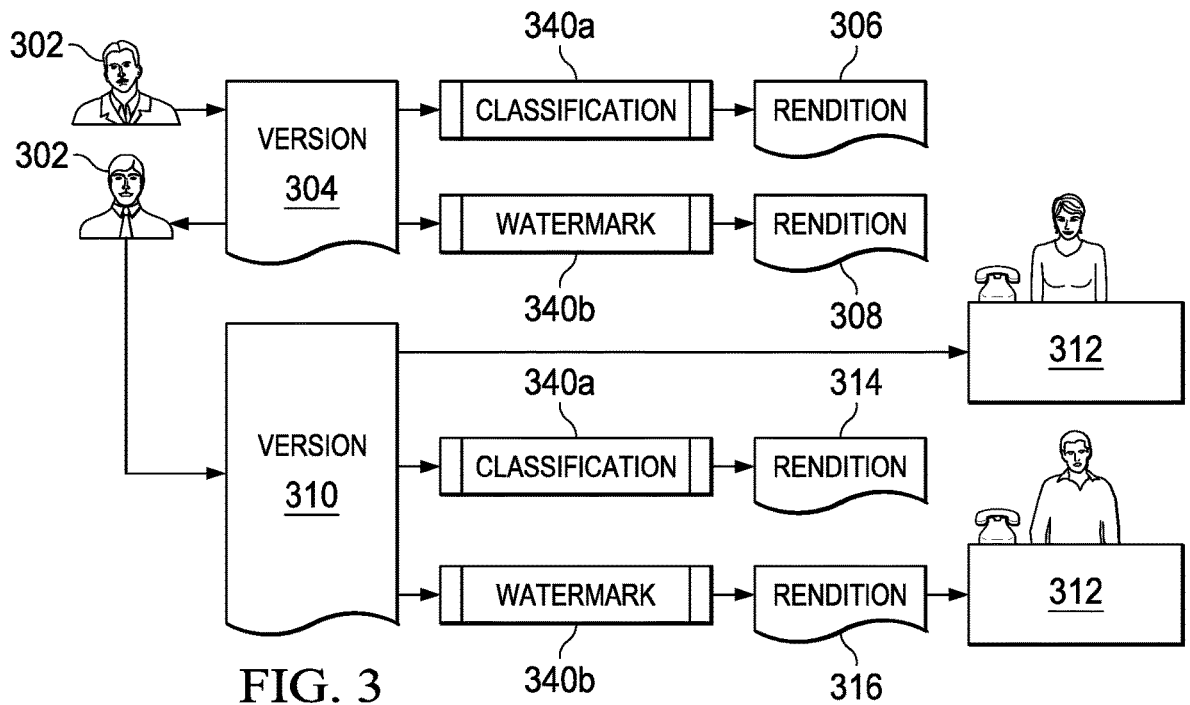
FIG. 3 depicts a diagrammatic representation of an example scenario using a document management system with versions and renditions.

FIG. 2 depicts a scenario useful in illustrating this document recovery issue and the proliferation of versions in a document management system such as that described above. Initially, a user 202 may create a document (e.g., the first version 204 of the document). This version of the document and the associated metadata are stored in the document store and metadata database of the document management system respectively. The addition of the first version 204 of the document may result in the generation of an event to a classification add-in module 240*a*. The classification module 240*a* may request access to a version of the document (e.g., through an interface of the document management system) and be provided with the first version 204 of the document.

Classification module 240*a* modifies the document to add a classification to the document. The classification add-in module 240 then adds the modified document to the document management system as a second version 206 of the document. This second version 206 of the document and the associated metadata are stored in the document store and metadata database of the document management system, respectively, and associated with the first version 204.

Subsequently, a watermark add-in module 240*b* may request access to a version of the document (e.g., because of a received event, a batch process execution of the watermark add-in module 240*b*, etc.). At this point, the current version of the document is the second version 206, which is provided to the watermark add-in module 240*b*. The watermark add-in module 240*b* may modify the second version 206 of the document (e.g., to add a watermark, such as a security clearance level or the like) and add the modified document to the document management system as a third version 208 of the document. This third version 208 of the document and the associated metadata are stored in the document store and metadata database of the document management system, respectively, and associated with the first version 204 and second version 206.

Suppose now that user 202 (who may be a privileged user in cases where only a privileged user may be allowed to modify a document) accesses the current version of the document. Here, the third version 208 will be provided to the user 202. Suppose further that this user 202 modifies the document and saves the document to the document management system as a new version. This fourth version 210 of the document and the associated metadata are stored in the document store and metadata database of the document management system respectively. At this point, if a user 212 (e.g., a non-privileged user or another type of user) accesses a current version of the document, the user will be provided with this fourth version 210 of the document.

Similarly to the above description, the addition of the fourth version 210 of the document may again result in the generation of an event to the classification add-in module 240*a*. The classification module 240*a* may again request access to a version of the document and be provided with the fourth version 210 of the document. Classification module 240*a* modifies the document to add a classification to this version of the document. The classification add-in module 240*a* then adds the modified document to the document management system as a fifth version 214 of the document. This fifth version 214 of the document and the associated metadata are stored in the document store and metadata database of the document management system respectively and associated with the other versions of the document.

Subsequently, a watermark add-in module 240*b* may once again request access to a version of the document (e.g., because of a received event, a batch process execution of the watermark add-in module 240*b*, etc.). At this point, the current version of the document is the fifth version 214, which is provided to the watermark add-in module 240*b*. The watermark add-in module 240*b* may modify the fifth version 214 of the document and add the modified document as a sixth version 216 of the document. This sixth version 216 of the document and the associated metadata are stored in the document store and metadata database of the document management system respectively and associated with the other versions of the document.

As can be seen from this simple example the proliferation of versions in a document management system may be highly problematic. For example, one concern with the proliferation of versions is storage cost. Since each update to a document creates a new version, more versions need to be managed. Five updates to a document will require six times the storage, if not more.

Another important limitation of versions is the difficulty in differentiating user and automated updates. Users have the ability to explicitly add new versions of documents. Perhaps they added a paragraph, or corrected some spelling mistakes. In such cases the user would typically add a new version to the document management system. If automated processes, such as add-in modules, are also creating versions, there are challenges keeping the order of operations correct, or communicating to the user which is a "real" new version with meaningful changes, versus a new version which has had automated tasks applied. To address these issues requires that a great deal of complexity be added to a document management system.

There are other issues with the proliferation of versions, including difficulty in tracking the number of versions added to a document management system. For example, a common requirement of document management systems is that such systems automatically place the current version number maintained by the document management system into the document. For example, the document may contain a footer that has the text "Confidential, Version 2.1". It can be difficult to maintain a correct document footer if the version number changes each time an automated (or other) update occurs.

As discussed above, renditions may be used to reduce the proliferation of versions. The use of renditions in this manner may, however, cause issues as well. FIG. 3 depicts a scenario useful in illustrating certain issues with use of renditions in this manner. Initially, a user 302 may create a document (e.g., the first version 304 of the document). This version 304 of the document and the associated metadata are stored in the document store and metadata database of the document management system respectively. The addition of the first version 304 of the document may result in the generation of an event to a classification add-in module 340a. The classification module 340a may request access to a version of the document and be provided with the first version 304 of the document. Classification module 340a creates a rendition of the document that incorporates the classification. The classification add-in module 340 then adds the generated rendition to the document management system 100 where it is stored as a first rendition 306 of the document. This first rendition 306 of the document and the associated metadata are stored in the document store and metadata database of the document management system respectively and associated with the first version 304.

Subsequently, a watermark add-in module 340b may request access to a version of the document (e.g., because of a received event, a batch process execution of the watermark add-in module 340b, etc.). Since the first version 304 is the current version of the document it is provided to the watermark add-in module 340b. The watermark add-in module 340b may create a rendition of the document based on first version 304 of the document that incorporates the watermark (e.g., to add a watermark, such as a security clearance level or the like) then adds the generated rendition 308 to the document management system. As the document management system may be configured to store only one rendition of the document the generated rendition may be stored as a first rendition 308 that replaces first rendition 306 (thus losing first rendition 306 of the document as modified by classification add-in module 340a). First rendition 308 of the document and the associated metadata are stored in the document store and metadata database of the document management system respectively and associated with the first version 304.

Suppose now that user 302 (who may be a privileged user) accesses the current version of the document. Here, the first version 304 will be provided to the user 302. Note here that the first version 304 does not contain any of the modifications made by either classification module 340a or watermark module 340b. Now suppose that this user 302 modifies the document and saves the document to the document management system as a new version. This second version 310 of the document and the associated metadata are stored in the document store and metadata database of the document management system respectively. At this point, if a user 312 (e.g., a non-privileged user or another type of user) accesses a current version of the document they will be provided with this second version 310 of the document.

The addition of the second version 310 of the document may result in the generation of an event to the classification add-in module 340a. The classification module 340a may request access to a version of the document and be provided with the second (current) version 310 of the document. Classification module 340a creates a rendition of the document that incorporates the classification. The classification add-in module 340a then adds the generated rendition to the document management system where it is stored as a second rendition 314 of the document (e.g., the first rendition of the second version 310 of the document). This second rendition 314 of the document and the associated metadata are stored in the document store and metadata database of the document management system respectively and associated with the second version 310 (and the first version 304, etc.).

Subsequently, a watermark add-in module 340b may request access to a version of the document. Since the second version 310 is the current version of the document it is provided to the watermark add-in module 340b. The watermark add-in module 340b may create a rendition based on version 310 that incorporates the watermark (e.g., to add a watermark, such as a security clearance level or the like) then adds the generated rendition to the document management system. As the document management system may be configured to store only one rendition of a version of the document the modified document may be stored as a second rendition 316 that replaces second rendition 314 (thus losing second rendition 314 of the document as modified by classification add-in module 340a). Second rendition 316 of the document and the associated metadata are stored in the document store and metadata database of the document management system respectively and associated with the second version 310, etc. At this point, if a user 312 (e.g., a non-privileged user) accesses the document, the user may be provided with this second rendition 316. As may be observed, this rendition may not contain the information added to second rendition 314 by classification add-in 340a.

From this example, it can be seen that the use of renditions to address version proliferation or other issues arising from updates (e.g., automated updates to documents) in document management systems is a flawed solution. Normally, a document management system would maintain only one rendition per document, or per version of a document. While this greatly reduces the problem of increasing storage costs since the number of renditions is bounded, renditions usually change the format of a document. The change of format greatly limits the range of solutions these renditions can accommodate. For example, a privileged user retrieving the original Word format document instead of a PDF Rendition will not see any updates such as security clearances, classifications or version numbers that have been inserted into the associated rendition. Conversely, a user retrieving a rendition of a document will have limited ability to edit the document.

Moreover, if renditions are utilized in this manner, a document management system will also have a difficult time ensuring that all automated updates are always applied. Most automated update processes are configured to access the current version of the document and store either a new version or a new rendition (which may overwrite any previous renditions). Thus, updates by an automated update process to a rendition are rarely if ever reflected in the version associated with the rendition. Instead, a new rendition may be created and any previous renditions overwritten. Thus, a sequence of updates will need special handling to be able to include all the automated updates that should be applied to the document. The implementation of such logistics in a document management system may actually be almost impossible if the updates are done asynchronously by different types of processes.

What is needed therefore are document management systems that allow processes or users (e.g., add-in modules or other update processes including those that act automatically) to act asynchronously (or synchronously) while accommodating these possible multiple asynchronous updates to a document, reducing the proliferation of versions of documents and corresponding storage requirements and preserving the easy and straightforward recovery of a canonical document (or a canonical version of the document).

To those ends, among others, embodiments of document management systems that utilize replicas are disclosed herein. Specifically, a replica may be an altered (e.g., modified or supplemented) copy of an original version of a document that retains the format of the version on which it is based. In some embodiments, a document management system may be configured to maintain only a single replica for a corresponding version of a document.

The core document management module of the document management system is configured to return a replica (if one exists) in response to a request for either a version of a document or a replica of the document. Thus, modifications by a user or an automated add-in module may be performed on the replica. When a process such as an add-in module stores the modified document it may store the modified document as a replica. This modified replica will replace the existing replica of the version (if one exists). In this manner, all asynchronous (or synchronous) modifications may be made to the replica, all such modifications may be cumulative, and an accessing user or process may have access to the replica of the document containing all the cumulative modifications. As a result the version of the document may be maintained in its original form (e.g., unmodified from when it was originally created) and may be utilized (e.g., to restore the document or to "roll-back" to) in cases where the replica is corrupted or otherwise inaccessible. Moreover, when a new version of a document is eventually created it will contain all the modifications of the replica on which it was based.

Figure 4:
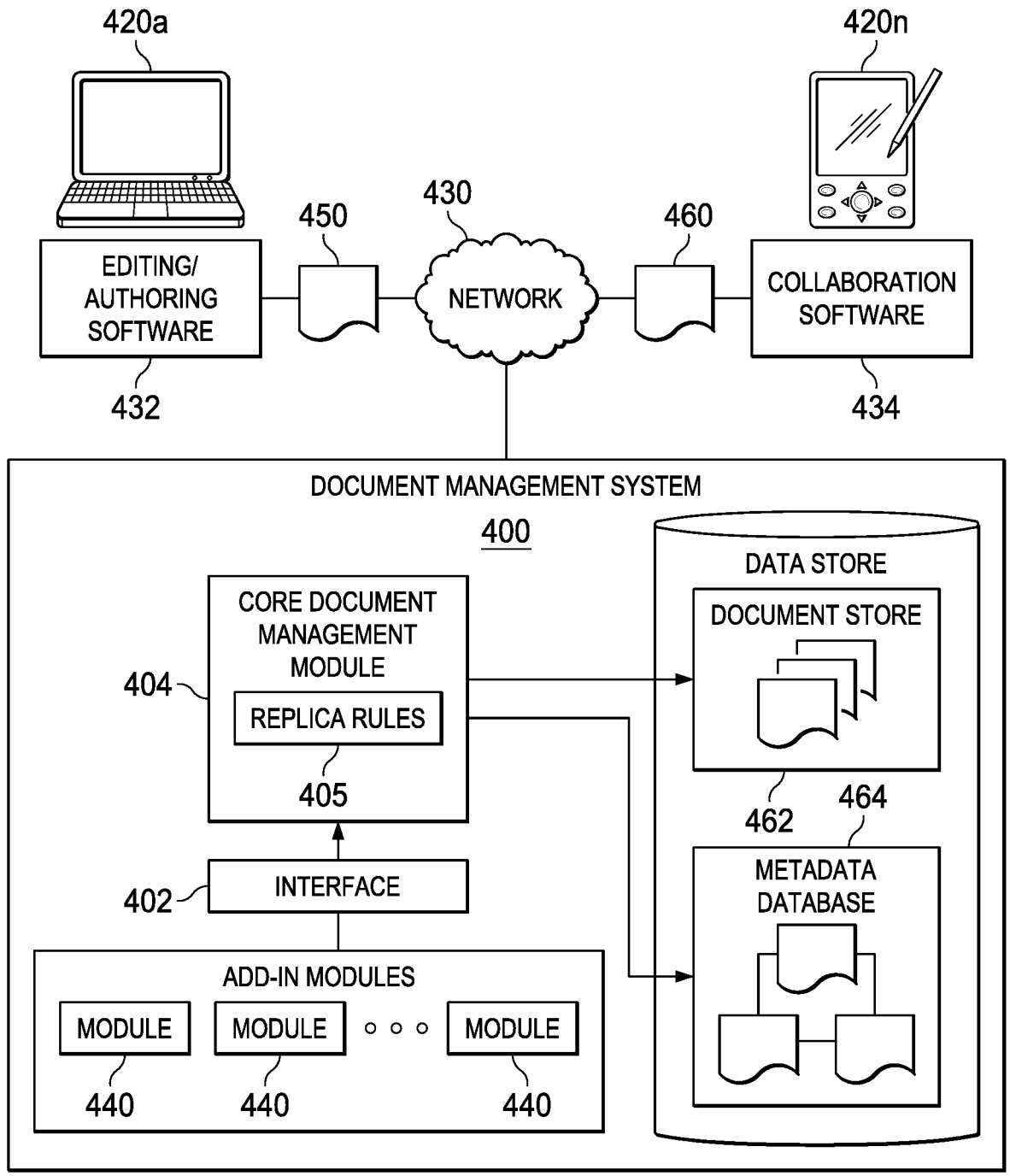
FIG. 4 depicts a diagrammatic representation of one embodiment of a document management system.

One embodiment of a document management system that employs replicas is illustrated in FIG. 4. Here, document management system 400 comprises a computer system, including a processor and a non-transitory computer readable medium, coupled to a network 430 such as the Internet, an internet, an intranet, a Local Area Network (LAN), a Wide Area Network (WAN), a wireless network, a wired network or some other type of computer network or combination of computer networks.

Document management system 400 includes an interface 402 accessible directly over network 430 by an application executing on a user's computer device 420 or from one or more add-in modules 440. Such an interface 102 may include an Application Programming Interface (API) or web service interface (e.g., a REpresentational State Transfer (REST) interface, a Simple Object Access Protocol (SOAP) interface, etc.). Such an interface 402 may be integrated with or accessed by an application at the user device 402, may be presented and accessed directly by the user at user device 420 (e.g., through interfaces presented in a browser executing on user device 420) or may be accessed by an add-in module 440 of the document management system 400.

The interface 402 may allow access to functionality of the document management system 400 offered through core document management module 404. The interface 402 may offer an interface for requesting access to a version of a document or to a replica of a document. Additionally, the interface 402 may offer an interface for the creation of a version of a document or a replica of a document. Using the interface 402 then, a version or replica may be added to the document management system 400 or a version or replica of a document managed by the document management system 400 may be accessed.

More specifically, core document management module 404 may manage documents stored in document storage 462 using metadata for managing the documents stored in metadata database 464. Thus, the content of the document (e.g., the bits that make up the document itself) are stored in document store 462 while the metadata for managing the documents stored in document store 462 is stored in the metadata database 464. Additionally, corresponding metadata for the document is created in the metadata database 464 for each version or replica of a document. For example, there may be an object or entry in a table, etc. (collectively entry) in metadata database 464 for the document object, an entry in metadata database 464 for each version or corresponding replica of the document as stored in document store 462 or other entries in metadata database 464 that allow the management of the document. The entries in the metadata database 464 include information to associate the different versions and replicas with one another and to locate the content of the versions or replicas in the document store 462.

Core document management module 404 is configured to implement requests received through interface 402 using the versions or replicas stored in document stored 462 and the metadata in metadata database 464. In particular, in one embodiment, core document management module 404 receives requests to access a version of a document through interface 402. Core document management 404 may determine if a replica of the requested version of the document exists (e.g., using metadata in metadata database 464). If a replica of the requested version exists, the core document management module 404 may retrieve the replica of the requested version of the document and return the replica of the requested version (instead of the requested version of the document) in response to the request for the version of the document. Thus, requests for a version of a document may result in the replica being returned in response to that request if a replica exists.

For example, an author may create an original version 450 of a document using editing/authoring software 432 running on user device 420a. A collaborator may request this version 450 of the document using collaboration software 434 running on using device 420n. Core document management module 404 may respond to this request with replica 460 of version 450. Collaborator may modify the replica 460 using collaboration software 434 and may store the modified document in document management system 400 through interface 402.

The user may, however, be unaware of how the document management system stores such a document, only believing that they are saving the document or creating a new version of the document. In many cases, the core document management module 404 may indeed save the modified document as a new version of the document. In some instances, however, the core document management module 404 may save the modified replica of the document as a replica (e.g., replacing the last replica) and this replica 460 will retain the edits made by the user without creating a new version of the document.

For example, if the option is available and the document is designated by the user as a replica at the time it is saved, the core document management module 404 may save the modified replica of the document as a replica and the replica 460 will retain the edits made without creating a new version of the document. In some embodiments, the user may specifically designate that the modified replica 460 be stored as a new version (e.g., if the user is a privileged user).

In one embodiment, core document management module 404 may include a set of replica rules 405 defining when core document management module 404 should create a replica of a version of a document. These rules may indicate that a replica is to be created automatically for a new version of the document, may specify a set of changes that when made by a user would result in the creation of a replica (e.g., instead of a new version). The rules 405 may also control the number of replicas that may be maintained. For example, the replica rules 405 may indicate that replicas are to be maintained only for a current version (or a specified number of versions) of a document (and thus previous replicas should be deleted when a new replica is created). Other replica rules 405 may be possible and are fully contemplated herein. Additionally, as mentioned above, interface 402 may allow a user or process to specify that a document is to be stored as a replica (or as a new version).

Thus, continuing with the above example, when the document is added to, or otherwise ingested by the document management system 400, the content of the document is stored as the first version 450 of the document in the document store 462. An entry for the document object and the first version 450 of the document is created in metadata database 464. Subsequently, a replica 460 of the first version 450 of the document is created. The replica may be created, for example, when the first version 450 is accessed and stored as a replica by a process, or may be created by the core document management module 404 based on a replica rule 405, etc. The content of the replica 460 may be stored in the document store 462 while an entry for the replica of the first version 450 of the document is created in the metadata database 464 and associated with the entry for the document object and an entry for the first version 450 of the document corresponding to the replica.

When the user attempts to access the first version 450 of the document (e.g., through editing/authoring software 432 or collaboration software 434), it can be determined from metadata database 464 that a replica of the version of the document exists, and the replica 460 may be provided to the user. When the replica 460 of the document is modified by the user and the modified document stored to the document management system 400 (e.g., the user may save the document or believe he is creating a new version of the document) the content of the modified replica 460 may, in many instances, be stored as a new version of the document. Alternatively, in some embodiments the modified replica 460 may replace the content of the replica 460 of the document in the document store 462 (e.g., if it is determined that a replica should be saved by core document management module 404).

In this manner, cumulative modifications may be made to the replica and stored while the corresponding version of the document may be maintained in its original form. Moreover, if a new version of a document is eventually created it will contain all the modifications of the replica on which it was based (e.g., the new version will be based on a replica if it exists as the replica will be returned in response to a request for a version of the document).

Add-in modules 440 may similarly use replicas. As discussed, document management system 400 may have a set of add-in modules 440. These modules 440 may be independently developed and added to the document management system 400. In particular, each of the modules 440 may operate substantially asynchronously (or synchronously) to perform certain functionality specific to that module 440. Moreover, these modules 440 may operate autonomously or automatically when certain events occur (e.g., without involvement of a user). For example, a module 440 may be a document properties synchronization (DPS) module intended to add metadata to a version of a document when a new version of a document is added or created.

Another module 440 may be a watermarking module that can include certain data (e.g., a security clearance level for a document) in a watermark for the document. Still another module 440 may be a classification module that may analyze a document to determine a records management classification for the document without user involvement. The module may add the classification to the document where it may be reflected in a field within the document such as the title page or document header. As will be noted, these types of add-in modules are provided by way of example, many other types of such add-in modules are possible and contemplated herein. Thus, there are many reasons why a document management within the document management system 400 may be modified or revised.

Thus, the architecture of the document management system 400 is extensible to allow independently developed add-in modules 440 to be added to the document management server 400 (e.g., by an entity deploying, developing, creating or providing the document management system 400). Specifically, when an add-in module 440 is integrated into the document management system 400 it may be allowed access as a privileged user of the document management system and register for events with an interface 402 or the core document management module 404. These events may include, for example, the creation of a new version of a document (e.g., in document store 462).

When an event occurs, a callback or other notification may be sent from the core document management module 404 to each module 440 that registered for that event. The module(s) 440 can then perform actions based on the event. To combat the proliferation of versions, one or more add-in modules 440 may be configured to store the modified document back to the document management system 400 as a replica (instead of a new version).

In particular, in many cases, a module 440 may request a current version or replica of the document (e.g., using an interface 402 such as an API or REST interface allowing the module 440 to obtain the current version or replica of the document). The module 440 will thus receive a replica of the requested version of the document from core document management module 404 if it exists, either because the replica was requested or because core document management module 404 is configured to return such a replica (instead of the requested version) if it exists. Otherwise, the module 404 will receive the requested version of the document.

In either case, the module 440 may perform one or more actions on the received document (e.g., version or replica), and store the modified document as a replica of the current version (e.g., using an interface 402 such as an API or REST interface allowing the module 440 to store the modified document as a replica). When the modified document is received by core document management module 404 and stored as a replica, the storage of the modified document either overwrites the previously stored replica for that version in document storage 462 (e.g., which was originally provided to the module 440) or the modified document is stored as a new replica of that version of the document by storing the content of the modified document as a replica in the document store 462. If a new replica is stored, an entry for the replica is created in the metadata database 464 and associated with the entry for the corresponding document object and entry for that version of the document.

Thus, it can be seen that the add-in modules 440, even though they may be operating asynchronously, may perform cumulative edits on a version through the use of replicas. Additionally, because only one replica may be maintained per version of a document, the cost of storage of document content and metadata may be controlled and bounded. Furthermore, because a version number may not change when a replica is created or modified fewer operations may be required to ensure that current version numbers are reflected in documents managed by the document management system. Moreover, document recovery may be aided, as the most recent version of the document is never modified; it is only the replica of that version that is modified.

It will be noted that certain techniques may be utilized to reconcile the complexities of concurrent events, such as when multiple add-in modules 440 want to access a document at the same time, or concurrently with a user creating a new version. These techniques may include reserving or locking documents that have pending operations, enforcing a queue for replica operations, preventing conflicting operations, setting a flag in the metadata indicating the replica has been checked out or a task is being performed on a replica, or other techniques, all of which are fully contemplated herein.

Moreover, certain management functionality may be offered by interface 402 and core document management module 404 with respect to these replicas. This functionality may include removing a replica and reverting (e.g., restoring or "rolling-back") to the original version; methods for reverting to an older version, with or without a replica; management of the processes that perform replica tasks; dashboards or charts that show the progress of replica operations; feedback methods to indicate to a user that a replica exists, or will be selected, or is pending creation; options for retrieving an original version instead of a replica of a version; audit records that track what replica operations were performed; or other functionality.

Figure 5A:
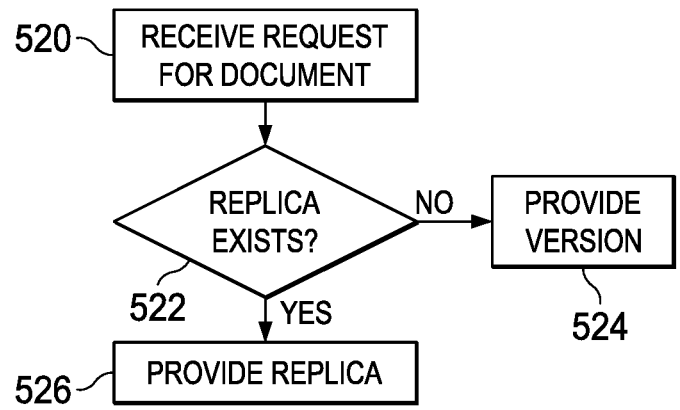
FIGS. 5A and 5B depict flow diagrams of embodiments of utilizing a version or a replica.
Figure 5B:
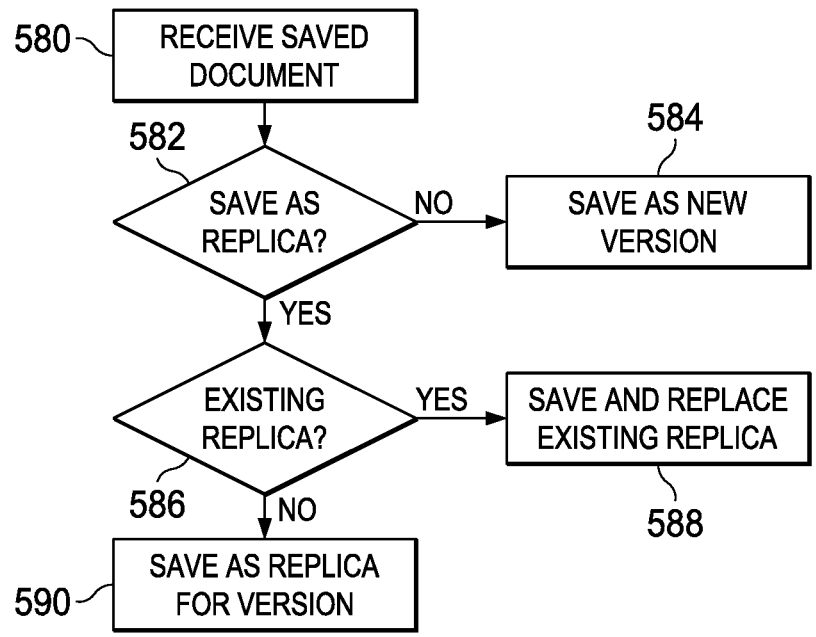

Referring now to FIGS. 5A and 5B, flow diagrams for embodiments of methods for using replicas in a document management system is depicted. Embodiments of such methods may, for example, be employed by a core document management module at a document management system. First looking at FIG. 5A, a flow diagram for one embodiment of a method for providing a replica is depicted. Initially, a request for a document may be received (STEP 520) such as through an interface of the document management system. As discussed, the request may be, for example, from an application executing on a user's computer device or from one or more add-in modules of the document management system.

The interface may allow for requesting access to a version of a document or to a replica of a document. The request may thus contain an identifier for the document being requested and an identifier for the version of the document being requested (it will be noted that these may be the same identifier in instances where the document and version identifiers may be combined). It can then be determined if a replica of the requested version of the document exists (STEP 522). To perform such a determination, the identifier of the document or version associated with the request may be utilized to access metadata associated with the document or version to determine, for the requested version of the document, if there is metadata indicating a replica for the version of the document exists.

If a replica of the requested version exists (YES branch of STEP 522), the replica of the requested version of the document may be retrieved from storage and the replica of the requested version returned (e.g., instead of the requested version of the document) in response to the request for the version of the document (STEP 526). Thus, requests for a version of a document may result in the replica being returned in response to that request if a replica exists.

If, however, no replica exists, (NO branch of STEP 522), the version of the requested version of the document may be retrieved from storage and returned in response to the request for the version of the document (STEP 524). Alternatively, in one embodiment, if it is determined that no replica of the requested version of the document exists, a replica may be created at this point from the requested version of the document and this newly created replica returned in response to the request for the version of the document. When the replica is created, an entry for the replica of the version of the document is created in the metadata and associated with the metadata for the document and metadata for the version of the document corresponding to the newly created replica.

Referring now to FIG. 5B, a flow diagram for one embodiment of a method for saving a replica or version of a document is depicted. A request to save a document may be received through an interface of the document management system (STEP 580). This request may be received from a user through an application executing on a user's computer device or from one or more add-in modules of the document management system. The request may thus contain an identifier for the document and an identifier for the version of the document being requested (it will be noted that these may be the same identifier in instances where the document and version identifiers may be combined). It can then be determined if the received document should be stored as a replica (STEP 582).

If, for example, it is determined (NO branch of STEP 582) that the document is a new document or does not have an associated document identifier or version identifier, the content of the document may be stored as a first version of the document (STEP 584). Metadata for the document and this first version of the document can also be created.

The storage request may be also received through an interface that may be used for requesting storage of the document as a replica. For example, in many cases, add-in modules may themselves be configured to request that documents be saved as a replica through the interface used for requesting storage of the document as a replica. Thus, in these case, no further evaluation is needed and it can be determined that a replica should be stored (YES branch of STEP 582).

Alternatively, the request to store the document may be received through an interface that expressly requests a new version be created (e.g., if the request is received from a user through an application executing on a user's computer device or if the user is a privileged user). If it is determined that the request is received through an interface requesting a new version be created (NO branch of STEP 582), the content of the document may be stored as a new version of the document (STEP 584). Metadata for the document and this first version of the document can also be created.

In certain instances there may be cases where, a request was not received through an interface used to requests a replica be stored, but it may nonetheless be desired to store a replica of the document. Accordingly, in one embodiment, to determine if a replica should be saved in association with the request (e.g., at STEP 582), a set of replica rules defining when a replica of a version of a document should be created may be applied. These rules may indicate that a replica is to be created automatically when a request to store the document is received from an add-in module or through a particular interface or in a particular format, or may specify a set of changes that when made by a user would result in the creation of a replica (e.g., instead of a new version). The rules may also control the number of replicas that may be maintained. For example, the replica rules may indicate that replicas are to be maintained only for a current version (or a specified number of versions) of a document (and thus previous replicas should be deleted when a new replica is created). Other replica rules may be possible and are fully contemplated herein.

If it is determined that the document received in association with the request should be saved as a replica (YES branch of STEP 582), it can be determined if a current replica for the version of the document currently exists (STEP 586). In particular, the identifier for the document and version can be used to access the metadata associated with the identifier and version to determine if the metadata associated with the document indicates that a replica for that version of the document exists. If a replica for the version of the document exists (YES branch of STEP 586), the content of the received document can replace the current replica (STEP 588).

In this manner, cumulative modifications may be made to the replica and stored while the corresponding version of the document may be maintained in its original form. Moreover, if a new version of a document is eventually created it will contain all the modifications of the replica on which it was based (e.g., the new version will be based on a replica if it exists as the replica will be returned in response to a request for a version of the document). Additionally, if needed, the metadata associated with the replica can be updated (e.g., to reflect the most recent access or edits, the user who most recently modified the document, the time the replica was created or other desired metadata for the replica).

If a replica for the version of the document does not exist (NO branch of STEP 586), the content of the received document can be stored as a replica of the version of the document (STEP 590). Metadata associated with the replica can be created and associated with the metadata for the document and the version of the document.

Figure 6:
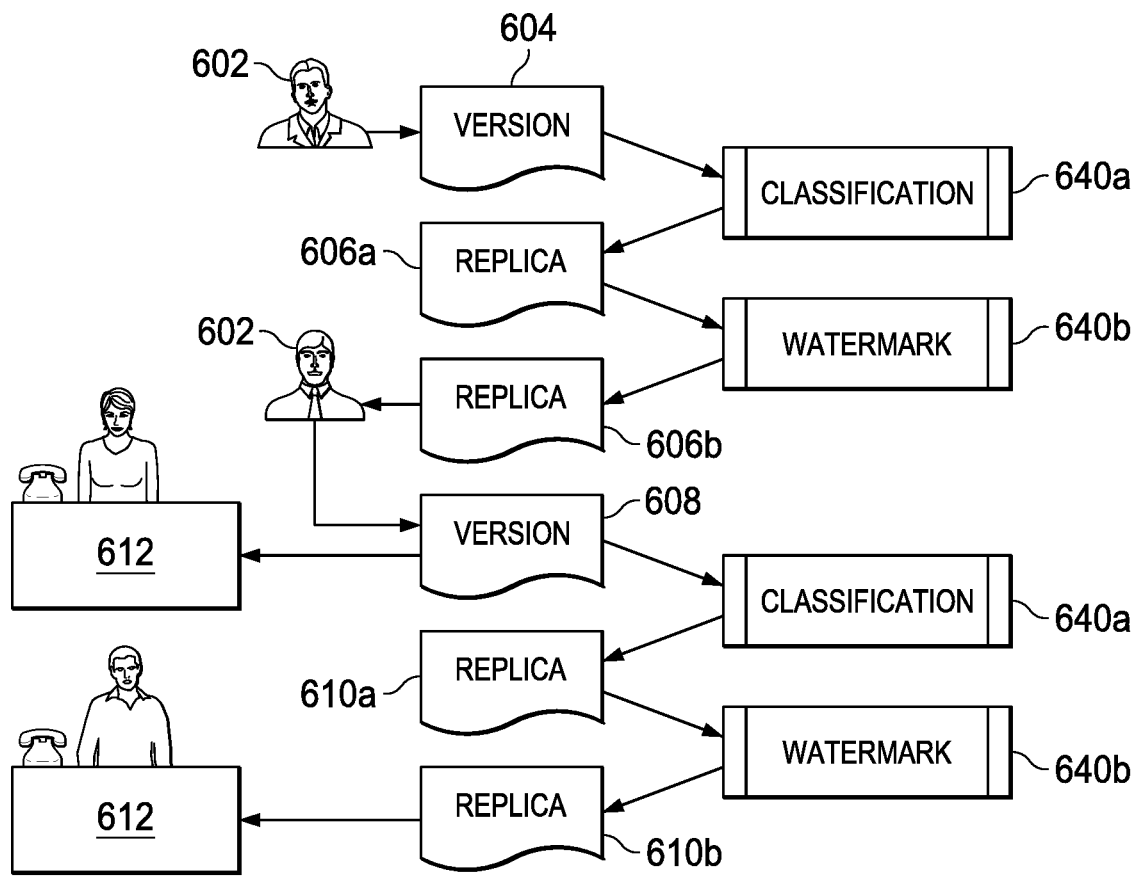
FIG. 6 depicts a diagrammatic representation of an example scenario using one embodiment of a document management system with versions and replicas.

FIG. 6 depicts a scenario useful in illustrating the use of replicas. Initially, a user 602 may create a document (e.g., the first version 604 of the document). This version 604 of the document and the associated metadata are stored in the document store and metadata database of the document management system respectively. The addition of the first version 604 of the document may result in the generation of an event to a classification add-in module 640*a*. The classification module 640*a* may request access to a version of the document and be provided with the first version 604 of the document. Classification module 640*a* modifies the document to add a classification to the document. The classification add-in module 640*a* then adds the modified document to the document management system as a replica and it is stored as a first replica 606*a* of the document. This first replica 606*a* of the document and the associated metadata are stored in the document store and metadata database of the document management system respectively and associated with the first version 604.

Subsequently, a watermark add-in module 640*b* may request access to a version of the document (e.g., because of a received event, a batch process execution of the watermark add-in module 640*b*, etc.). Since the first version 604 is the current version of the document and a replica 606*a* of the first version 604 exists, the first replica 606*a* is provided to the watermark add-in module 640*b*. The watermark add-in module 640*b* may modify the first replica 606*a* of the document (e.g., to add a watermark, such as a security clearance level or the like) and adds the modified document to the document management system as a replica. The document management system may be configured to store only one replica of the document, in which case the modified document may be stored as a first replica 606*b* replacing the previous first replica 606*a*. Thus, first replica 606*b* now contains the modifications made by both classification add-in module 640*a* and watermark add-in module 640*b*.

Suppose now that user 602 (who may be a privileged user) accesses the current version of the document. Here, as first replica 606*b* of the first version 604 (e.g., containing the modifications made by both classification module 640*a* and watermark module 640*b*) exists it will be provided to the user 602. Now suppose that this user 602 modifies the document and saves the document to the document management system as a new version. This second version 608 of the document and the associated metadata are stored in the document store and metadata database of the document management system respectively. At this point, if a user 612 (e.g., a non-privileged user or another type of user) accesses a current version of the document they will be provided with this second version 608 of the document (as no replica for the second version currently exists).

The addition of the second version 608 of the document may result in the generation of an event to the classification add-in module 640*a*. The classification module 640*a* may request access to a version of the document and be provided with the second (current) version 608 of the document (as no replica currently exists for the second version 608). Classification module 640*a* modifies the document to add a classification to the document. The classification add-in module 640*a* then adds the modified document to the document management system as a replica and it is stored as a first replica 610*a* of the second version 608 of the document. This first replica 610*a* of the (second version of the) document and the associated metadata are stored in the document store and metadata database of the document management system respectively and associated with the second version 608.

Subsequently, a watermark add-in module 640*b* may request access to a version of the document (e.g., because of a received event, a batch process execution of the watermark add-in module 640*b*, etc.). Since the second version 608 is the current version of the document and a replica 610*a* of the second version 608 exists, the first replica 610*a* (of the second version 608) is provided to the watermark add-in module 640*b*. The watermark add-in module 640*b* may modify the first replica 610*a* of the document (e.g., to add a watermark, such as a security clearance level or the like) and adds the modified document to the document management system as a replica. The document management system may be configured to store only one replica of the document.

Thus, the modified replica may be stored as second replica 610*b* replacing the previous first replica 610*a* (of the second version 608). Thus, second replica 610*b* now contains the modifications made to second version 608 by both classification add-in module 640*a* and watermark add-in module 640*b*. At this point, if a user 612 (e.g., a non-privileged user) accesses the document they may be provided with this second replica 610*b*. Notice here that second version 608 is preserved as it was originally created, thus allowing simple reversion to the original second version 608 in cases where the second replica 610*b* is corrupted or otherwise rendered unusable by the document management system or add-in modules. More specifically, if at any point it is determined that a replica is corrupted, the version of the document may be restored. In many cases this restoration may be accomplished simply by deleting the replica of the version such that the version will again be provided in response to any subsequent request or a new replica may be created.

It should be noted that while embodiments herein have been described utilizing particular methods for managing and accessing replicas and versions, other embodiments may utilize replicas and versions differently and these embodiments are fully contemplated herein. For example, when a replica of a version is initially created, the replica may replace the original version and the original version may be set aside. Thus, the replica is treated as the version. In this case, the core document management module may be configured to respond to requests for the version with the current version (e.g., which will be the current version or a replica that has been substituted for the version). In this manner, changes to the system may be minimized and legacy functionality substantially preserved for established document management applications while still preserving the original stored version (which has been set aside) for use if the need arises.

Also, it should be noted that while renditions and replicas have been described separately herein, replicas can be utilized with renditions. In such embodiments, the purpose of a rendition may still be to provide the document in a file format that is appropriate for ordinary users. Versions may represent true updates of the document, typically by a privileged user, as opposed to updates applied by a process (e.g., automated process). The creation of a new version or the generation of a new replica may trigger the creation of a rendition (e.g., a different format of the corresponding version or replica). Ordinary (e.g., non-privileged) users may be given the rendition when retrieving a document, while privileged users may have access to a version or replica as appropriate and described above.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention.

Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code any of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/Figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. Accordingly, the scope of this disclosure should be determined by the following claims and their legal equivalents.

What is claimed is:

1. A document management system, comprising:
   a processor;
   a data store;
   a non-transitory computer readable medium, comprising instructions for:
   providing an interface; and
   a core document management module for:
   storing a first document in the data store;
   storing a version of the first document in the data store such the version of the first document and the first document are separate files in the data store;
   storing a first replica of the version of the first document in the data store while keeping the version of the first document in an original form such the first replica, the version of the first document and the first document are separate files in the data store, wherein the first replica is a copy of the version that retains a format of the version;
   receiving, through the interface, a first request for the version of the first document, wherein the request is received from an asynchronous add-in module;
   providing the first replica from the data store to a user from the data store in response to the first request instead of the requested version, wherein the asynchronous add-in module modifies the first replica to create a second document;
   receiving, through the interface, a second request to store the second document as a second replica of the version of the first document, wherein the second request is received from the add-in module that modified the first replica; and
   storing the received second document as the second replica by replacing the first replica in the data store with the received second document while keeping the version of the first document in the data store in the original form and keeping the first document in an original form, wherein the second replica is an altered copy of the version that retains the format of the version.

2. The document management system of claim 1, wherein the first and second request are received from a user computer over a network.

3. The document management system of claim 1, wherein the instructions are further for:
   creating a rendition of the second replica in the data store, wherein the rendition is in a different format than the second replica;
   receiving, through the interface, a third request for the version of the first document;
   determining whether the user associated with the third request is a privileged or a non-privileged user; and
   providing the second replica from the data store in response to the third request when the user is a privileged user; and
   providing the rendition from the data store in response to the third request when the user is a non-privileged user.

4. The document management system of claim 1, wherein the instructions are further for:
   determining that the second rep ca is corrupted and restoring the version of the first document.

5. The document management system of claim 4, wherein restoring the first version of the document comprises deleting the second replica of the first document.

6. A method for managing documents in a distributed network access environment, comprising:
   storing a first document in the data store;
   storing a version of the first document in the data store such the version of the first document and the first document are separate files in the data store;
   storing a first replica of the version of the first document in the data store while keeping the version of the first document in an original form such the first replica, the version of the first document and the first document are separate files in the data store, wherein the first replica is a copy of the version that retains a format of the version;
   receiving, through an interface, a first request for the version of the first document, wherein the request is received from an asynchronous add-in module;
   providing the first replica to a user from the data store in response to the first request instead of the requested version, wherein the asynchronous add-in module modifies the first replica to create a second document;
   receiving, through the interface, a second request to store the second document as a second replica of the version of the first document, wherein the second request is received from the add-in module that modified the first replica; and
   storing the received second document as the second replica by replacing the first replica in the data store with the received second document while keeping the version of the first document in the data store in the original form and keeping the first document in an original form, wherein the second replica is an altered copy of the version that retains the format of the version.

7. The method of claim 6, wherein the first and second request are received from a user computer over a network.

8. The method of claim 6, further comprising:
   creating a rendition of the second replica in the data store, wherein the rendition is in a different format than the second replica;
   receiving, through the interface, a third request for the version of the first document;
   determining whether the user associated with the third request is a privileged or a non-privileged user; and
   providing the second replica from the data store in response to the third request when the user is a privileged user; and
   providing the rendition from the data store in response to the third request when the user is a non-privileged user.

9. The method of claim 6, further comprising, determining that the second replica is corrupted and restoring the version of the first document.

10. The method of claim 9, wherein restoring the first version of the document comprises deleting the second replica of the first document.

11. A non-transitory computer readable medium comprising instructions for managing documents in a distributed network access environment by:

storing a first document in the data store;

storing a version of the first document in the data store such the version of the first document and the first document are separate files in the data store;

storing a first replica of the version of the first document in the data store while keeping the version of the first document in an original form such the first replica, the version of the first document and the first document are separate files in the data store, wherein the first replica is a copy of the version that retains a format of the version;

receiving, through an interface, a first request for the version of the first document, wherein the request is received from an asynchronous add-in module;

providing the first replica to a user from the data store in response to the first request instead of the requested version, wherein the asynchronous add-in module modifies the first replica to create a second document;

receiving, through the interface, a second request to store the second document as a second replica of the version of the first document, wherein the second request is received from the add-in module that modified the first replica; and storing the received second document as the second replica by replacing the first replica in the data store with the received second document while keeping the version of the first document in the data store in the original form and keeping the first document in an original form, wherein the second replica is an altered copy of the version that retains the format of the version.

12. The non-transitory computer readable medium of claim 11, wherein the first and second request are received from a user computer over a network.

13. The non-transitory computer readable medium of claim 11, further comprising instructions for:

creating a rendition of the second replica in the data store, wherein the rendition is in a different format than the second replica;

receiving, through the interface, a third request for the version of the first document;

determining whether the user associated with the third request is a privileged or a non-privileged user; and providing the second replica from the data store in response to the third request when the user is a privileged user; and providing the rendition from the data store in response to the third request when the user is a non-privileged user.

14. The non-transitory computer readable medium of claim 11, further comprising instructions for determining that the second replica is corrupted and restoring the version of the first document.

15. The non-transitory computer readable medium of claim 14, wherein restoring the first version of the document comprises deleting the second replica of the first document.

* * * * *

UNITED STATES PATENT AND TRADEMARK OFFICE
CERTIFICATE OF CORRECTION

PATENT NO. : 10,810,264 B2
APPLICATION NO. : 15/601730
DATED : October 20, 2020
INVENTOR(S) : Patrick Thomas Sidney Pidduck and Kyle Nathan Swidrovich It is certified that error appears in the above-identified patent and that said Letters Patent is hereby corrected as shown below:

In the Claims

Claim 4:
Column 26, Line 12, delete "rep ca" and insert -- replica --

Signed and Sealed this
Fifteenth Day of December, 2020

Andrei Iancu
*Director of the United States Patent and Trademark Office*